Patented May 4, 1937

2,078,963

UNITED STATES PATENT OFFICE 2,078,963

PROCESS FOR REFINING CRUDE NAPHTHALENE

Stuart Parmelee Miller, Scarsdale, N. Y., assignor to The Barrett Company, New York, N. Y., a corporation of New Jersey No Drawing. Application March 3, 1934, Serial No. 713,923

17 Claims. (Cl. 260—168)

This invention relates to the purification of naphthalene and is especially directed to methods for the crystallization of crude naphthalene whereby its purification is effected in a more rapid and more efficient manner than by formerly known methods.

Naphthalene is generally obtained from the distillates of coal tar. In its commercially pure form it is a solid product having a melting point of 79–80° C. In its crude form it varies from an oily semi-solid material melting in the neighborhood of 50° C. to a more or less crystalline solid material, the melting point of which may be as high as 78° C.; the latter material contains relatively small amounts of oily impurities.

The impurities contained in crude naphthalene consist for the most part of neutral, aromatic hydrocarbon oils that are liquid at ordinary atmospheric temperatures, tar-acids, pyridine bases, and unsaturated hydrocarbons, the amounts of which differ for naphthalene products of different melting points. For example, crude naphthalene of 60° C. melting point may contain about 35% of the above impurities while a crude naphthalene of 70° C. melting point may contain about 20% of such impurities.

Crude naphthalene as recovered from the coal tar distillates has hitherto commonly been purified by one of two well-known methods:

*Method I.*—The crude naphthalene of, say, 60° C. melting point, is melted and run to shallow pans in which it is allowed to cool and recrystallize. This recrystallized material is removed as a solid, is crushed, and is separated from oily impurities by means of a centrifuge. The crystals are usually washed in the centrifuge with water at a temperature somewhat below the melting point of the crystals. By this procedure the crude material having a melting point of 60° C. will usually be purified so that its melting point is raised to about 72–74° C.

If a higher degree of purity is required the operation is repeated, i. e., the 72–74° C. melting point material is re-crystallized and separated from additional oily impurities by centrifugal action. In this manner crystals melting at 78–78.5° C. are recovered. The naphthalene may be melted again, washed in molten condition with strong sulfuric acid solution and with sodium hydroxide solution. The washed molten product may be crystallized in the presence of the sodium hydroxide by adding cold water to the molten naphthalene and sodium hydroxide solution in a tank equipped with an agitator to cool the material gradually and effect crystallization of the washed naphthalene. The crystals may be separated from the water containing impurities such as sodium sulfonates etc. by centrifugal action or by draining. The crystalline material is then distilled for recovery of commercially pure naphthalene having a melting point of 79.5–80° C.

*Method II.*—Crude molten naphthalene, melting at about 60° C., is settled to remove solid material and then is pumped into a tank equipped with an agitator and containing a considerable volume of warm water. Cold water is introduced slowly to cool the naphthalene; crystals form and remain suspended in the water. When the temperature has been reduced to the desired extent, say to 40° C., the slurry of crystals and water is run to a centrifuge in which both water and oily impurities adhering to the crystals are removed. The crystals are then washed in the centrifuge with additional warm water. After washing, the purified naphthalene melts at about 72–74° C. The process is repeated if material with a melting point of 78–78.5° C. is desired.

The material melting at 78–78.5° C. may be melted and washed with strong sulfuric acid solution and with sodium hydroxide solution, and may be crystallized and distilled as described under Method I, to produce commercially pure naphthalene.

Methods I and II have several common features which are troublesome and which cause loss in yield both of naphthalene itself and of neutral oils and tar-acids present as impurities in the crude naphthalene. The oils associated with the naphthalene as impurities, including tar-acids dissolved in the oils, have a specific gravity so close to that of water that they are separated from water only with difficulty; furthermore, the tar-acids are appreciably soluble in water. After recovery of as much of the oil as can readily be separated by decantation, the waste water from the crystallizations above described and from the washing operations is commonly run to the sewer. This water usually contains from ¼% to 1% by volume of oils, containing naphthalene and tar-acids, in emulsified or finely suspended form and additional tar-acids in aqueous solution. In this manner a substantial loss of tar-acids, neutral oils, and naphthalene results. For example, in purifying crude naphthalene of 60° C. melting point to commercially pure material approximately 2–3% of the crude naphthalene may be lost in the waste water as phenols, neutral oils, and naphthalene. In a plant processing 10,000,000 pounds of crude naphthalene per year this amounts to 200,000–300,000 pounds or approximately 25,000–35,000 gallons per year of these materials.

The oils separated from the naphthalene by Methods I or II contain tar-acids, i. e., phenols. It is common practice to subject these oils after their removal from the naphthalene to extraction with caustic soda for the recovery of tar-acids contained in them. As far as I am aware no one previously has recognized the advantages of extraction of the tar-acids from the crude naphthalene itself simultaneously with crystallization; no process has previously been proposed which incorporates the advantages of my present invention. Both the purified naphthalene and the oily impurities removed from it by previous processes have contained tar-acids, a considerable proportion of which has been lost in solution in the wash water and cooling water above mentioned. Besides representing a considerable loss, these oils and tar-acids in waste water constitute a serious nuisance when run into public water courses used as sources of drinking water or containing game or food fish.

Even in the process in which the sulfuric-acid-washed naphthalene is crystallized in the presence of alkaline solution, no commercial recovery of tar-acids is effected because of the contamination of the alkaline solution with amounts of sulfonic acid salts greatly in excess of the amount of any tar-acids which might be present.

A seemingly obvious method for elimination of the losses of oil and naphthalene in the waters would appear to be to use these waters over again for washing or for crystallization of naphthalene. This is impractical for the following reasons: (a) The water used for crystallization must be sufficiently cool to remove the sensible and latent heat from the naphthalene crystallized in it. Because of the difficulty of effecting complete separation some naphthalene remains in this water after crystallization. If the water were cooled for re-use, some of this naphthalene would crystallize out on the cooling surfaces, and would so reduce the heat transfer capacity as to make the process in a short time unworkable. If cooling in tanks is resorted to in order to overcome this difficulty, a relatively enormous tank capacity is required to furnish the necessary cooling effect. (b) The water used for washing the crystallized naphthalene in centrifuges must be substantially oil-free if purification is to be accomplished. No practical means have been found for reducing the oil content of a once used water to anything like the required degree.

I have invented a method for treatment of naphthalene which avoids the losses resulting in the prior processes of purifying naphthalene as above described, which eliminates the nuisance resulting from oils and naphthalene in public water courses, and which in addition yields a purified naphthalene of quality higher than that recovered by prior methods.

In the new process I employ instead of water, a solution of an alkali-metal hydroxide, e. g., sodium hydroxide, for purifying naphthalene containing hydrocarbon oils, phenols, unsaturated compounds, and perhaps pyridine bases. The warm alkaline solution used for washing the naphthalene is run to a separator in which oils are removed; the solution is reheated and reused until its phenolate content reaches the desired maximum; then it is replaced with fresh alkaline solution.

The quality of the purified naphthalene obtained by my process is higher than that obtained by the use of water as in the processes hitherto known. The separation of oil from the alkaline solution is rapid and complete; this complete separation facilitates cooling for reuse by preventing deposition of crystalline material on cooling coils. Equipment of only relatively small capacity is required as distinct from the very large tanks previously needed. The alkaline treatment is applied to the naphthalene before it is treated with sulfuric acid to eliminate unsaturated compounds and pyridine bases and hence tar-acids are separated uncontaminated by sulfonates and are in such a condition that their recovery is commercially feasible.

In applying my process to Method I described above, the naphthalene crystals in the centrifuge are washed with warm alkali-metal hydroxide solution. The alkali-metal hydroxide reacts with tar-acids to form water-soluble salts. Thus even the thin oil film remaining on the washed naphthalene crystals is freed of tar-acids and a higher quality of naphthalene results. The mixed oil and alkaline solution resulting from this washing of the naphthalene is run to a tank or other device in which the oil separates rapidly and completely from the aqueous solution. The aqueous solution is separated, and is reheated and reused for washing more naphthalene. When the alkali has been exhausted to a greater or less extent by the formation of alkali-metal phenolates, the solution is replaced by fresh alkali-metal hydroxide solution and the spent solution containing phenolates is treated for recovery of tar-acids. No waste water containing oil or tar-acids need be run to the sewer. Recovery of valuable oil is complete and the oil, in the course of the process, is freed of tar-acids so that a separate tar-acid extraction operation is avoided In applying my process to Method II previously described, I employ an aqueous alkali-metal hydroxide solution instead of water both in crystallizing the naphthtlene and in washing it in the centrifuge. In the former method as above described a two stage process is employed if a product of around 78° C. melting point is desired. In accordance with my process the melting point of the naphthalene is in the majority of cases raised to this value by a single step so that a repetition of the crystallization is unnecessary. In some instances, of course, the naphthalene product of the first crystallization, may have a lower melting point, e. g. as low as 74° C., and in these instances a second crystallization step similar to the first may be used for effecting its further purification. In each case the alkaline solution is reused until its phenolate content rises to the desired extent; then it is replaced by fresh alkaline solution. Solution used in the crystallization step and removed by the centrifuge is run, together with the oily impurities, to a settling tank or decanter. The oil separates practically completely; the alkaline solution is cooled by passing it through a heat exchanger and is reused for further crystallization of naphthalene. In this manner all neutral oil is recovered; all phenols are collected as aqueous phenolate solution and are later recovered therefrom; the neutral oil requires no separate extraction treatment for the recovery of tar-acids.

As above stated, a sulfuric acid washing may be applied to the partly purified naphthalene having a melting point of about 78° C. or more. In this case still further benefits accrue as a result of my process.

The crystals of naphthalene, melting for example at 78–78.5° C., at the end of the centrifuging operation have adhering to them about 4–6%, more or less, of water. After removal from the centrifuge these crystals are melted prior to the sulfuric acid treatment. The density of the molten naphthalene is so nearly that of water that little if any water separates from the naphthalene. The washing of this molten naphthalene with sulfuric acid requires the use of strong sulfuric acid. The water present in the molten naphthalene dilutes the sulfuric acid initially added for washing and since the purification depends on the presence of strong sulfuric acid, this dilution tends to prevent thorough purification in this step. To overcome this difficulty, it is necessary prior to purification to add sulfuric acid, agitate to mix the sulfuric acid and water, settle, and separate the dilute sulfuric acid from the molten naphthalene. Then after water has been removed in this manner, the purification may be effected satisfactorily by washing the naphthalene with strong sulfuric acid.

In the improved process the crystals from the centrifuge are melted. The 4–6% of alkali-metal hydroxide solution adhering has a density sufficiently higher than that of the molten naphthalene to permit its rapid and complete separation from the naphthalene in a settling tank or decanter. The separated naphthalene is thus "dry" and requires no preliminary "drying" with relatively valuable strong sulfuric acid before the sulfuric acid washing can begin to function for purifying the naphthalene. An important reduction in consumption of valuable reagent as well as saving in operating time and elimination of operating steps results.

While I have described the new process as being carried out with sodium hydroxide, other alkaline liquors may be used, e. g., potassium hydroxide solution, sodium carbonate solution containing free alkali, sodium phenolates containing free alkali, the caustic liquors recovered by recausticization of sodium carbonate solutions obtained in the liberation of tar-acids from phenolates by means of carbon dioxide gas, partly spent caustic liquors previously employed for extraction of tar-acids, or the like. Likewise it is not necessary that the caustic liquors be reused until the phenolate content is built up to the maximum usually desired; such liquors may be used once and transferred to other operations in which tar-acids are being extracted from phenol-bearing oil.

The use of caustic liquors according to my method in the steps prior to the sulfuric acid washing step results in an improvement in quality of naphthalene sufficient to make unnecessary in many cases, the final crystallization in alkaline solution after the sulfuric acid wash. Such a crystallization step serves to aid in removing from the naphthalene, sulfonic acids and other alkali-soluble products resulting from the reaction of sulfuric acid upon the molten, partially purified naphthalene, and therefore, if it is desired to produce naphthalene of maximum purity, such a crystallization step may be employed to advantage for elimination of such reaction products.

In order that my invention may be more fully understood, the following example is given by way of illustration but not by way of limitation.—

*Example:*—3000 gallons of crude naphthalene having a melting point of about 64° C. are heated to a temperature slightly above the melting point of the naphthalene and the resulting molten naphthalene is then crystallized in the presence of an 8% aqueous sodium hydroxide solution. About 6000 gallons of the aqueous alkaline solution are used.

Around one-third of the alkaline solution is first mixed with the molten naphthalene in a vessel equipped with a suitable agitator, while maintaining a sufficiently elevated temperature to prevent crystallization of the naphthalene. The amount of solution added under these conditions may be varied considerably, the main consideration being to have sufficient of the aqueous solution present during crystallization to prevent caking of naphthalene crystals and to yield a slurry of sufficient mobility to be easily agitated.

The remainder of the 6000 gallons of aqueous sodium hydroxide solution, which is at a sufficiently low temperature (ordinary temperature for example) to cool the molten naphthalene-caustic mixture to a temperature below the naphthalene melting point, is then added gradually with continuous stirring to cause the naphthalent to slowly crystallize forming a naphthalene slurry in the alkaline solution. The naphthalene crystals thus formed are separated from oil and aqueous solution by centrifugal action. The resultant crystallized and partially purified naphthalene ordinarily has a melting point of around 78° C. If the product has a melting point lower than this, it may be remelted and crystallized with additional aqueous alkaline solution, the second purification being effected in the same manner and with the same quantity of alkaline solution as the first.

Whether a single crystallization step or two crystallization steps are employed, the crystallized naphthalene is washed, preferably in the centrifuge, with an additional 6000 to 9000 gallons of 8% aqueous sodium hydroxide solution having a temperature in the neighborhood of 40° C.

The washed naphthalene crystals possess a good color and physical appearance and have a melting point of about 78.5 to 78.8° C.

The purified naphthalene then may be subjected to further purification in the customary manner, for example by melting, treating the molten naphthalene first with sulfuric acid and then with sodium hydroxide solution, and crystallizing the treated molten naphthalene in the presence of sodium hydroxide solution.

The aqueous sodium hydroxide solution employed in the various working steps of my process, together with oil and other impurities removed from the naphthalene, is conveyed to a suitable mechanical separator, for example a decanter or centrifuge, wherein the oil is separated from the aqueous solution. This oil is substantially free from tar-acids but may contain basic constituents originally present therein. The aqueous solution on the other hand contains the tar-acids in the form of sodium phenolates. This phenolate-containing alkaline solution is preferably used again for the cooling, crystallization, or washing, respectively, of further quantities of naphthalene. It may be used repeatedly for treatment of naphthalene until its alkali-metal hydroxide content is so reduced by reaction with tar-acids that further quantities of tar-acids are incompletely reacted upon. Substantially all of the alkali-metal hydroxide may be reacted in this manner but it is preferred that the reaction be carried to a point slightly under complete reaction of the alkali-metal hydroxide so that the solution may be subjected to distillation or evaporation to separate any neutral oils present while at the same time there will be no danger of converting phenolates to free phenols and causing their simultaneous removal. Then the solution may be treated to liberate the phenols, e. g., by treatment with CO₂.

The phenolate-containing alkaline solution before it has reached a condition of saturation with tar-acids may, however, be used for other purposes, such as the extraction of phenols from phenol-containing oils. Or the alkaline solution may be used countercurrent fashion for treating progressively impurer naphthalene and thus may be used first as a washing solution for the partially purified product and then as a crystallization and washing medium in the earlier stages of the process.

I claim:

1. A method of producing crystallized naphthalene substantially free of tar-acids which comprises crystallizing naphthalene containing a substantial amount of tar-acids in the presence of sufficient aqueous alkaline solution to react with all the tar-acids in the naphthalene and separating the resulting phenolate solution from the crystallized naphthalene.

2. The method of purifying a crude, normally solid naphthalene containing unsaturated hydrocarbon oils and tar-acids, which comprises washing said naphthalene with an aqueous alkali-metal hydroxide solution so as to remove tar-acids as alkali-metal phenolates in aqueous solution substantially free from sulfonates, and subsequently washing the substantially tar-acid-free naphthalene with strong sulfuric acid to remove unsaturated hydrocarbons therefrom.

3. The method of purifying a crude, normally solid naphthalene containing unsaturated hydrocarbon oils and tar-acids, which comprises washing said naphthalene with an aqueous alkali-metal hydroxide solution so as to remove tar-acids as alkali-metal phenolates in aqueous solution substantially free from sulfonates, mechanically separating the washing solution from the washed naphthalene so as to form a naphthalene product of low water content, and subsequently washing the substantially tar-acid-free naphthalene of low water content with strong sulfuric acid to remove unsaturated hydrocarbons therefrom.

4. The method of purifying crude low-melting naphthalene, which comprises mixing the naphthalene in molten condition with aqueous alkaline solution, cooling the mixture to crystallize the crude naphthalene in the presence of aqueous alkaline solution, separating liquid from the naphthalene crystals, melting the naphthalene crystals to form molten naphthalene, bringing the molten naphthalene into intimate contact with aqueous alkaline solution, effecting the recrystallization of the naphthalene in contact with aqueous alkaline solution, and separating liquid from the recrystallized naphthalene.

5. In the purification of crude naphthalene having a melting point of about 64° C., the step which comprises effecting the crystallization of the naphthalene in the presence of an aqueous alkaline solution.

6. The method of recovering oils from crude, oil-containing naphthalene, which comprises effecting the crystallization of the naphthalene in the presence of aqueous alkaline solution, separating oil and aqueous solution from the naphthalene crystals, and then separating the oils from the aqueous solution.

7. In the recovery of tar-acid-free oils from crude, oil-containing naphthalene by a process comprising bringing the naphthalene into contact with an aqueous liquid and thereby forming a mixture of oil and aqueous liquid, the step which comprises mechanically separating the oil from the aqueous liquid while the aqueous liquid contains alkali-metal hydroxide in solution.

8. The method of purifying crude naphthalene, which comprises agitating the naphthalene in molten condition with aqueous sodium hydroxide solution, cooling the mixture by the addition of a further portion of aqueous sodium hydroxide solution so as to crystallize naphthalene in the presence of the sodium hydroxide solution, and separating the resultant oil and aqueous solution from the naphthalene crystals.

9. The method of purifying crude naphthalene, which comprises agitating the naphthalene in molten condition with aqueous sodium hydroxide solution, cooling the mixture by the addition of a further portion of aqueous sodium hydroxide solution so as to crystallize naphthalene in the presence of the sodium hydroxide solution, separating the resultant oil and aqueous solution from the naphthalene crystals, melting the naphthalene crystals and washing the resultant molten naphthalene with strong sulfuric acid, and separating the purified naphthalene from the sulfuric acid.

10. The method of purifying crude, hydrocarbon-oil-containing naphthalene having a melting point of about 64° C., which comprises agitating the crude naphthalene in molten condition with dilute aqueous sodium hydroxide solution, cooling the mixture by the addition of a further portion of aqueous sodium hydroxide solution so as to crystallize the naphthalene, the total volume of sodium hydroxide solution used being about twice that of the crude naphthalene treated, subjecting the resultant crystals to centrifugal action to separate the oil and aqueous solution therefrom, washing the separated crystals with a dilute aqueous sodium hydroxide solution at a temperature of around 40° C. and of a volume equal to between two and three times the original volume of the crude molten naphthalene, and subjecting the crystals of naphthalene to centrifugal action to separate wash solution therefrom.

11. The method of purifying crude, hydrocarbon-oil-containing naphthalene having a melting point of about 64° C., which comprises agitating the crude naphthalene in molten condition with dilute aqueous sodium hydroxide solution, cooling the mixture by the addition of a further portion of aqueous sodium hydroxide solution so as to crystallize the naphthalene, the total volume of sodium hydroxide solution used being about twice that of the crude naphthalene treated, subjecting the resultant crystals to centrifugal action to separate the oil and aqueous solution therefrom, melting the naphthalene crystals and agitating the molten naphthalene with aqueous sodium hydroxide solution, cooling the mixture by the addition of a further portion of aqueous sodium hydroxide solution to effect the recrystallization of the naphthalene in contact with aqueous sodium hydroxide solution, the total volume of solution in this recrystallization step being substantially equal to that used in the first crystallization step, subjecting the naphthalene crystals to centrifugal action to separate oil and aqueous solution therefrom, washing the separated crystals with a dilute aqueous sodium hydroxide solution at a temperature of around 40° C. and of a volume equal to between two and three times the original volume of the crude molten naphthalene, and subjecting the crystals of naphthalene to centrifugal action to separate wash solution therefrom.

12. The method of separating crude hydrocarbon oil impurities from crude naphthalene of at least 50° C. melting point containing components which are reacted upon by strong sulfuric acid at the temperature at which the crude naphthalene is molten, which comprises contacting the molten crude naphthalene with an aqueous alkaline solution and crystallizing the naphthalene in the presence of the aqueous alkaline solution.

13. The method of recovering tar acids from normally solid naphthalene containing tar acids and hydrocarbons which react with strong sulfuric acid at the temperature at which the naphthalene is molten, which comprises treating the molten crude naphthalene with an aqueous alkali metal hydroxide solution so as to convert the tar acids to alkali metal phenolates, crystallizing the crude naphthalene in the presence of aqueous alkali metal hydroxide solution, separating the aqueous solution from the crystallized naphthalene, treating additional quantities of naphthalene with the alkali metal hydroxide solution until the alkali metal hydroxide is nearly completely reacted to form phenolates, and, after separation thereof from the naphthalene, acidifying the aqueous solution to recover tar acids therefrom.

14. The method of separating crude hydrocarbon oil impurities from crude naphthalene of at least 50° C. melting point containing components which are reacted upon by strong sulfuric acid at the temperature at which the crude naphthalene is molten, which comprises contacting the molten crude naphthalene with an aqueous alkaline solution, crystallizing the naphthalene in the presence of the aqueous alkaline solution, and separating the solution from the crystals so formed.

15. The method of separating crude hydrocarbon oil impurities from crude naphthalene of at least 50° C. melting point containing components which are reacted upon by strong sulfuric acid at the temperature at which the crude naphthalene is molten, which comprises contacting the molten crude naphthalene with an aqueous alkaline solution, crystallizing the naphthalene in the presence of the aqueous alkaline solution, separating the solution from the crystals so formed, and washing the crystals with aqueous alkaline solution.

16. In the purification of crude naphthalene having a melting point in the neighborhood of 74° C. and not over 78° C. and containing hydrocarbon oils which at the temperature at which the crude naphthalene is molten react with strong sulfuric acid, the step which comprises effecting the crystallization of the naphthalene in the presence of an aqueous alkaline solution.

17. The method of separating crude hydrocarbon oil impurities from crude naphthalene of at least 50° C. melting point containing components which are reacted upon by strong sulfuric acid at the temperature at which the crude naphthalene is molten, which comprises contacting the molten crude naphthalene with an aqueous alkali-metal hydroxide solution, crystallizing the naphthalene in the presence of the aqueous alkali-metal hydroxide solution, and mechanically separating the liquid from the crystals so formed.

STUART PARMELEE MILLER.